3,466,327
BENZOIC ACID HYDRAZIDE DERIVATIVES
AND COMPOSITIONS
Rudolf Tschesche, Bonn-Rottgen, and Franz Riemhofer, Marl, Germany, and Jack Bernstein, New Brunswick, N.J., assignors to E. R. Squibb & Sons, Inc., New York, N.Y., a corporation of Delaware
No Drawing. Filed Mar. 30, 1966, Ser. No. 538,591
Int. Cl. C07c 109/10; A61k 27/00
U.S. Cl. 260—559　　　　　　　　　　　　　　　　4 Claims This invention relates to benzoic acid hydrazide derivatives and compositions containing them.

Coccidiosis is a disease affecting primarily poultry and is caused by protozoa of the genus Eimeria, especially *E. tenella*, *E. necatrix* and *E. acervulina*. This disease causes severe and frequently fatal infection in poultry flocks. It constitutes a serious economic hazard.

Current practice in poultry raising is the feeding of coccidiostatic preparations in the general diet as a prophylactic measure. Known coccidiostats have failings in that they are not as highly effective as desirable, do not exert their effect against all species of infective organisms, are not free of undesirable side effects and/or are not economically feasible. It is an object of this invention to provide compounds and compositions which prevent the development and spread of coccidiosis effectively at low, economical levels and also for administration in treatment of the disease.

Although the compounds of this invention are preferred for use against coccidiosis, they also have antimicrobial activity, for example in combating *Staphylococcus aureus*, *Tichomonas vaginalis* or *Escherischia coli*.

The compounds of this invention have the formula

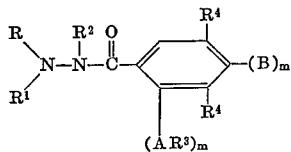

wherein $m$ is 0 or 1, R and $R^1$ each is hydrogen, lower alkyl or cyclo-lower alkyl, $R^2$ is hydrogen or lower alkyl, $R^3$ is lower alkyl or lower alkenyl, $R^4$ is nitro R and $R^1$ are lower alkyl when $m$ is 0, and $R^4$ is hydrogen and R and $R^1$ are hydrogen or lower alkyl when $m$ is 1, A is oxygen or sulfur, B is nitro, amino, lower alkylamino, di-lower alkylamino, lower alkanoylamino, $R^5$-phenyl-lower alkanoylamino, benzoyl, $R^5$-benzoyl, and $R^5$ is hydrogen, halo, nitro, amino, lower alkyl, lower alkoxy or lower alkanoyl.

The lower alkyl groups in all of the substituents referred to above are straight or branched chain hydrocarbon groups such as methyl, ethyl, propyl, isopropyl, butyl, s-butyl, t-butyl and the like. The lower alkenyl groups are of the same type including a double bond. In each instance, methyl is the preferred lower alkyl group. The cyclo-lower alkyl groups include cyclopropyl, cyclobutyl, cyclopentyl, cyclohexyl and cycloheptyl. The lower alkanoyl groups are the acyl radicals of lower fatty acids, e.g., acetyl, propionyl and the like. All four halogens are contemplated but chloro and bromo are preferred. The preferred compounds of Formula I are those wherein R and $R^1$ are both lower alkyl, especially methyl, $R^2$ is hydrogen, $R^4$ is nitro and $m$ is 0.

Illustrative compounds include 2,2-dimethyl-3',5'-dinitrobenzoic acid hydrazide,
1-methyl-3',5'-dinitrobenzoic acid hydrazide,
1,2,2-trimethyl-3',5'-dinitrobenzoic acid hydrazide,
1,2-dimethyl-3',5'-dinitrobenzoic acid hydrazide,
2,2-dimethyl-4'-dimethylamino-2'-methoxybenzoic acid hydrazide,
2,2-dimethyl-4'-nitro-2'-allyloxybenzoic acid hydrazide,
2-methyl-4'-acetylamino-2'-methylmercaptobenzoic acid hydrazide,
2,2-dimethyl-4'-(benzoylmethylamino)-2'-methoxybenzoic acid hydrazide,
2,2-dimethyl-4'-(benzoylmethylamino)-2'-methoxybenzoic acid hydrazide,
2,2-dimethyl-4'-(p-chlorophenacetylmethylamino)-2'-ethoxybenzoic acid hydrazide.

The compounds of the formula may be synthesized by treatment of an appropriately substituted hydrazide with an acyl halide (preferably the acyl chloride). In those cases wherein R, $R^1$ and $R^2$ are all hydrogen the reaction is preferably carried out by treatment of a solution of hydrazine hydrate with a lower allyl ester such as the methyl ester of the appropriately substituted benzoic acid.

The compounds of the formula, and especially 2,2-dimethyl-3',5'-dinitrobenzoic acid hydrazide, are most effectively provided to the animal in its food or drink. Thus it may be placed in solution or in suspension in its drinking water or preferably admixed in the feed composition.

The compositions of this invention may be produced by intimately dispersing the active ingredient or ingredients throughout a carrier or diluent which is either solid or liquid. Preferably, the two compounds are thoroughly admixed with a major proportion of poultry feed supplied to the fowl, e.g., chick starter, broiler and grower feeds, laying mashes, breeder and turkey breeder mashes, turkey starter and grower feeds and the like.

The active material may also be incorporated in premixes wherein higher proportions of the active ingredients are present. The concentrated premix is then diluted with additional feed by the feed supplier or poultry grower, for example, one pound of premix per ton of feed, to obtain a feed containing the requisite amount of coccidiostat.

It will also be appreciated that the active ingredients may be supplied in combination with an inert carrier or diluent such as Attapulgus clay, bentonite or edible vegetable materials. Liquid dispersions in water can be prepared by using emulsifiers and/or surface active agents.

The amount of compound of the formula incorporated in the food or water is in the range of about 0.005 to 0.2% (by weight), preferably about 0.02 to 0.04%. In addition, the incorporation of a tetraalkylthiuram disulfide, e.g., tetramethylthiuram disulfide, tetraethylthiuran disulfide and the like, frequently enhance the action of a compound of the formula and thus conserve the amount of the latter required. Thus, a total of about 0.005 to 0.1% (by weight) preferably about 0.01 to 0.03% of the combined substances in the feed is usually adequate. Approximately equal proportions (percent by weight) of the two components is sufficient, but a ratio of about 1 to 3 parts of the hydrazide to about 1 to 3 parts of the disulfide may be used. The preferred combination contains 2,2-dimethyl - 3',5' - dinitrobenzoic acid hydrazide and tetraethylthiuram disulfide.

The following examples are illustrative of the invention. All temperatures are on the centigrade scale.

EXAMPLE 1

2,2-dimethyl-3',5'-dinitrobenzoic acid hydrazide

To a solution of 12 grams of N,N-dimethylhydrazine in 250 ml. of anhydrous ether there is added dropwise, with vigorous stirring, a solution of 23.05 grams of 3,5-dinitrobenzoyl chloride in 750 ml. of anhydrous ether. A yellow oil precipitates from the solution during the addition, but gradually crystallizes. The reaction mixture is stirred for an additional 10 minutes after the addition of the acid chloride is completed and is then filtered. The solid is washed with ether and then suspended in 250 ml. of cold water. The mixture is filtered, washed with a small amount of cold water and allowed to dry. The yellow white solid is purified by crystallization from water. This solid melts at 170.5–171.5°.

EXAMPLE 2

1,2-dimethyl-4'-nitro-2'-ethoxybenzoic acid hydrazide

A solution of 21.3 grams of 4-nitro-2-ethoxybenzoyl chloride in anhydrous benzene is added slowly to a dispersion of 12 grams of 1,2-dimethylhydrazine in 150 ml. of benzene. The reaction mixture is then heated to reflux with vigorous stirring and refluxed for one hour. The reaction mixture is then cooled, concentrated and filtered. The residue is triturated with water to remove 1,2-dimethylhydrazine hydrochloride and the residue, after drying, is crystallized from benzene to yield the desired 1,2-dimethyl-4'-nitro-2'-ethoxybenzoic acid hydrazide.

EXAMPLE 3

4-dimethylamino-2-methoxybenzoic acid hydrazide

A mixture of 20.9 grams of methyl-4-dimethylamino-2-methoxybenzoate and 9 grams of 85% hydrazine hydrate in 250 ml. of methanol is refluxed for 20 hours and then concentrated to remove most of the solvent. The residue is filtered and recrystallized from aqueous methanol to yield the desired 4-dimethylamino-2-methoxybenzoic acid hydrazide.

EXAMPLE 4

1-methyl-3',5'-dinitrobenzoic acid hydrazide

Following the procedure of Example 1 but substituting an equivalent quantity of methylhydrazine for the 1,1-dimethylhydrazine there is obtained 1-methyl-3',5'-dinitrobenzoic acid hydrazide.

Following the procedure of Example 3, but substituting an equivalent amount of the indicated methyl ester, there is obtained the corresponding hydrazide.

[Below R'=(AR$_3$)$_m$ and R''=(B)$_m$ in the formula]

| Ex. | 2=R'=4'R''=benzoic acid methyl ester | 2=R'=4=R''=benzoic acid hydrazide |
|---|---|---|
| 5 | R'=allyloxy, R''=acetamido | R'=allyloxy, R''=acetamido. |
| 6 | R'=ethoxy, R''=acetamido | R'=ethoxy, R''=acetamido. |
| 7 | R'=methylmercapto, R''=acetamido. | R'=methylmercapto, R''=acetamido. |
| 8 | R'=methoxy, R''=amino | R'=methoxy, R''=amino. |
| 9 | R'=ethoxy, R''=benzamido | R'=ethoxy, R''=benzamido. |
| 10 | R'=methoxy, R''=methylamino. | R'=methoxy, R''=methylamino. |

EXAMPLE 11

4-(p-chlorobenzoylmethylamino)-2-methoxybenzoic acid hydrazide (a) Methyl 2-methoxy-4-methylaminobenzoate.—A suspension of 4-methylaminosalicylic acid in anhydrous ether is treated with a solution of diazomethane in ether until the further addition of the diazomethane solution no longer causes an evolution of nitrogen and the solution retains its yellow color. During this addition the 4-methylaminosalicylic acid goes into solution. The reaction mixture is then allowed to evaporate to yield the desired methyl 2-methoxy-4-methylaminobenzoate which is used without further purification in (b).

(b) Methyl 4-(p-chlorobenzoylmethylamino)-2-methoxybenzoate.—Methyl 2-methoxy-4-methylaminobenzoate is dissolved in anhydrous pyridine and anhydrous benzene. To this solution there is added slowly a solution of p-chlorobenzyl chloride in anhydrous benzene and the mixture then warmed to 80° for two hours. The cooled mixture is poured onto cracked ice and the benzene layer separated. The aqueous layer is extracted with benzene and the benzene extracts combined. The benzene extracts are washed with water, dilute hydrochloric acid solution, water and finally with 5% potassium carbonate solution. The benzene solution is dried over magnesium sulfate and is then concentrated to yield the desired methyl 4-(p-chlorobenzoylmethylamino)-2-methoxybenzoate.

(c) 4-(p-chlorobenzoylmethylamino)-2-methoxybenzoic acid hydrazide.—Following the procedure of Example 3 but substituting an equivalent amount of methyl 4-(p-chlorobenzoylmethylamino)-2-methoxybenzoate for the methyl 4-dimethylamino-2-methoxybenzoate, there is obtained the desired 4-(p-chlorobenzoylmethylamino)-2-methoxybenzoic acid hydrazide.

EXAMPLE 12

A conventional basal ration having the following ingredients is prepared:

Meat and bone scrap
Fish meal
Vitamin $B_{12}$
Poultry-by-product meal
Dehulled soybean oil meal
Dehydrated alfalfa meal
Corn gluten meal
Pulverized oats
Ground barley
Corn meal
Wheat middlings
Dried grain and whey fermentation solubles
Methionine hydroxy analogue calcium
Riboflavin
Calcium pantothenate
Choline chloride
Niacin
Animal fat
Menadione sodium bisulfite
Vitamin E supplement
Butylated hydroxytoluene
Vitamin A palmitate
D-activated animal sterol
Calcium carbonate
Defluorinated phosphate
Salt
Calcium iodate
Manganese oxide
Zinc oxide
Cobalt hydroxide
Cobalt carbonate A feed composition is prepared by adding 2,2-dimethyl-3',5'-dinitrobenzoic acid hydrazide to the basal ration in an amount constituting 0.03% by weight of the final mixture. The ingredients are thoroughly admixed to provide the ration which is fed to young chicks about 3 weeks old.

EXAMPLE 13

A chick feed is prepared as in Example 12 but substituting 0.03% by weight of 4-dimethylamino-2-methoxybenzoic acid hydrazide.

EXAMPLE 14

A basal ration is prepared as in Example 12. To the basal ration are added 0.01% by weight of 2,2-dimethyl-3',5'-dinitrobenzoic acid hydrazide and 0.01% by weight of tetramethylthiuram disulfide. The ingredients are thoroughly admixed and utilized in the same manner as in Example 12.

Compositions utilizing other compounds of the formula above may similarly be prepared.

What is claimed is:
1. A compound of the formula

$$\begin{array}{c} R \\ \diagdown \\ R^1 \end{array} N-N-\overset{R^2}{\underset{|}{C}}-\overset{O}{\underset{\|}{C}}-\underset{OR^3}{\bigcirc}-B$$

wherein R, $R^1$ and $R^2$ each is hydrogen or methyl, $R^3$ is lower alkyl or lower alkenyl, B is nitro, amino, lower alkylamino, di-lower alkylamino, lower alkanoylamino, benzoylamino or p-halobenzoylmethylamino, the lower alkyl, lower alkenyl and lower alkanoyl groups having up to 4 carbon atoms.

2. A compound as in claim 1 wherein R, $R^1$ and $R^2$ are each hydrogen, $R^3$ is allyl and B is acetamido.

3. A compound as in claim 1 wherein R and $R^1$ are each methyl, $R^2$ is hydrogen, $R^3$ is ethyl, and B is nitro.

4. A compound as in claim 1 wherein R, $R^1$ and $R^2$ are each hydrogen, $R^3$ is ethyl and B is acetamido.

References Cited

UNITED STATES PATENTS

| 2,951,868 | 9/1960 | Harris et al. | 260—558 |
| 3,072,713 | 1/1963 | Gutmann | 260—559 |

HENRY R. JILES, Primary Examiner

H. I. MOATZ, Assistant Examiner

U.S. Cl X.R.

260—471, 544, 558; 424—324